United States Patent [19]
Moreland, II et al.

[11] 3,711,672
[45] Jan. 16, 1973

[54] MAGNETICALLY COUPLED CONTROL FOR APPLIANCE

[75] Inventors: William C. Moreland, II, Export; William R. Cobb, Murrysville, both of Pa.; Charles R. Tyke, Lexington, Ohio

[73] Assignee: Westinghouse Electric Corporation, Pittsburgh, Pa.

[22] Filed: Jan. 11, 1972

[21] Appl. No.: 217,007

[52] U.S. Cl. ............ 219/10.49, 126/211, 219/10.75, 336/DIG. 2, 338/12
[51] Int. Cl. ............................................. H05b 5/08
[58] Field of Search..219/10.49, 10.77, 10.75, 10.79; 126/395, 211; 336/DIG. 2; 338/12; 226/163

[56] References Cited

UNITED STATES PATENTS

| | | | |
|---|---|---|---|
| 3,530,499 | 9/1970 | Schroeder | 219/10.49 |
| 2,537,733 | 1/1951 | Brenner | 338/12 |
| 2,492,727 | 12/1949 | Ballard | 338/12 |

Primary Examiner—J. V. Truhe
Assistant Examiner—B. A. Reynolds
Attorney—F. H. Henson et al.

[57] ABSTRACT

A magnetically coupled control arrangement especially adapted for an appliance, such as a cooking device subject to being dirtied from cooking spills, has a user-operated control member knob with multiple alternating magnetic poles on its underside adapted to be placed against a control area on a substantially non-magnetic sheet to register with a following member, having multiple alternating magnetic poles complementary to the poles of the control members, in the space underlying the control area, with the follower member being linked to adjustable means for controlling the operation to be carried out, such as the cooking operation. The arrangement is such that the user-operated control member may be removed completely from the control area to facilitate cleaning that part of the device.

8 Claims, 9 Drawing Figures

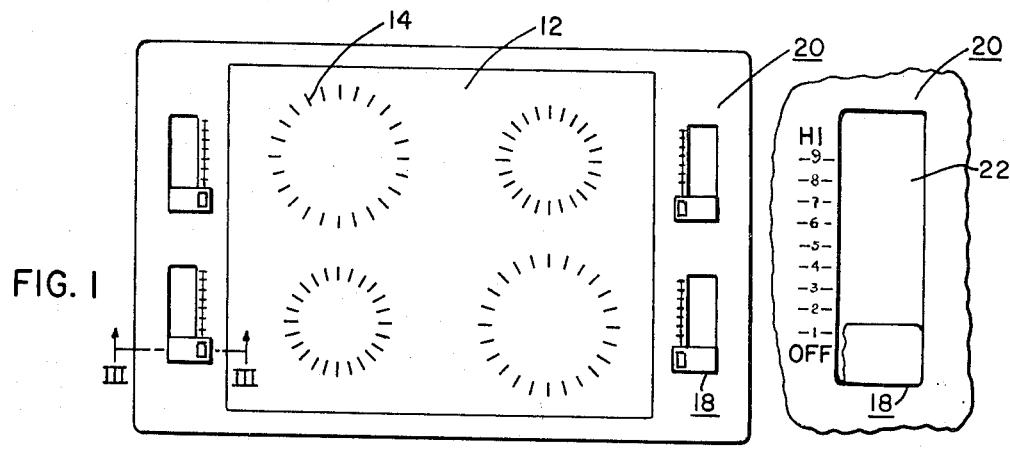
FIG. 1
FIG. 2
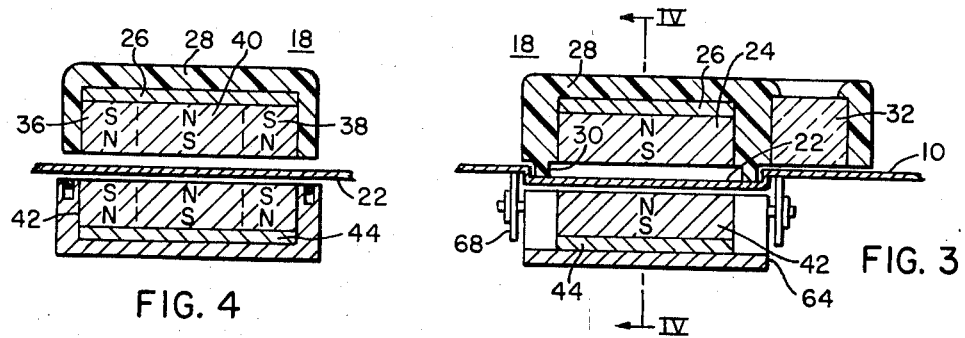
FIG. 4
FIG. 3
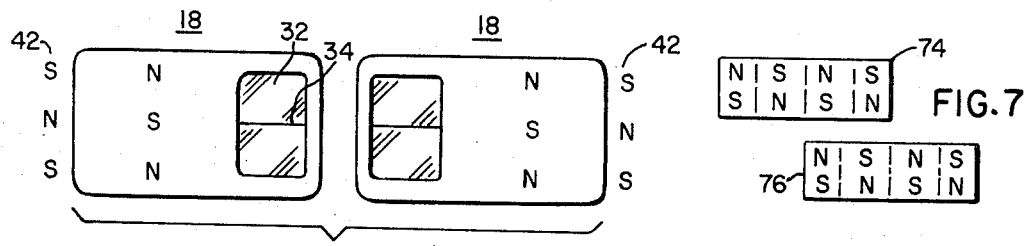
FIG. 5
FIG. 7
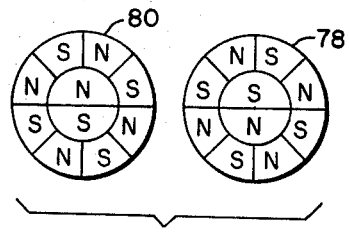
FIG. 8
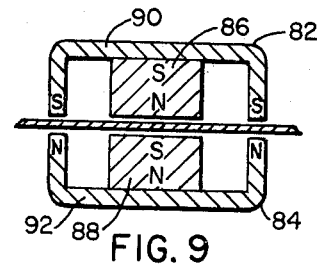
FIG. 9

MAGNETICALLY COUPLED CONTROL FOR APPLIANCE

BACKGROUND OF THE INVENTION

1. Field of the Invention

This invention pertains generally to the art of magnetically coupled controls for appliances and in particular to magnetically coupled controls useful with cooking devices such as a countertop cooking platform.

2. Description of the Prior Art

Substantial improvements has been made in the cleanability of cooking devices in recent years as evidenced, for example, by the commercialization of self-cleaning ovens and flush top cooking platforms such as illustrated in U.S. Pat. No. 3,586,825. While the flush top cooking unit, particularly of the type having a single piece of ceramic plate as a cooking surface upon which most spillovers would drop, provides significant advantages with respect to cleanability of the plate itself, so far as we know no particular attention has been directed to easy cleanability of the switch knobs located adjacent each cooking area. It is acknowledged that some efforts have been made to provide for protection for those electric switches located near cooking areas from condensate and spillovers as evidenced by U.S. Pat. No. 3,160,737.

Our invention provides a control arrangement especially adapted to be employed in connection with flush top cooking units, although applicable also to other cooking devices as well as appliances generally. The arrangement promotes easy cleanability as well as complete protection of the controlling switches from cooking soils.

SUMMARY OF THE INVENTION

In accordance with our invention, we provide a control panel for the device having a control area of substantially non-magnetic material, a user-operated control member with multiple alternating magnetic poles on its face confronting the control area and which is adapted to be moved within the control area or removed completely from the control area, a follower member underlying the control area and having multiple alternating magnetic poles complementary to the poles of the control member on its face confronting the control area, and means coupling the follower member to control means adapted to provide control of operation produced by the device.

In the preferred form, both the control member and follower member each include three alternating magnetic poles on their confronting faces, means are provided to guide the follower member in its path of movement and at least visual indicia are provided on the control area to guide the user who has removed a control member as to the correct lateral positioning of the control member upon its replacement.

DRAWING DESCRIPTION

FIG. 1 is a plan view of a flush top cooking unit of the character in which the principle of induction heating is used for cooking, and to which the invention is particularly well suited, although not limited thereto;

FIG. 2 is a plan view, enlarged relative to FIG. 1, of a fragmentary portion of the panel which includes a control area;

FIG. 3 is a vertical cross-section corresponding to one taken along the line III—III of FIG. 1, and enlarged relative to FIG. 1;

FIG. 4 is a vertical cross-section corresponding to one taken along the line IV—IV of FIG. 3;

FIG. 5 is a generally schematic view illustrating the relationship between the poles of the control members and the underlying follower members for both a right side and left side surface unit to illustrate the ready interchangeability of the control members between sides when an uneven number of poles are provided in the members;

FIG. 7 is a generally diagrammatic view to illustrate the possibility of a mis-registry of the control member and follower member if they were to have four poles confronting each other;

FIG. 8 is a diagrammatic view of an arrangement of poles of a control member and follower member which may be used when the movement of the control member and follower member is rotational; and FIG. 9 is a sectional view showing another form that the control and follower member may take.

DESCRIPTION OF THE PREFERRED EMBODIMENTS

Figure 6:
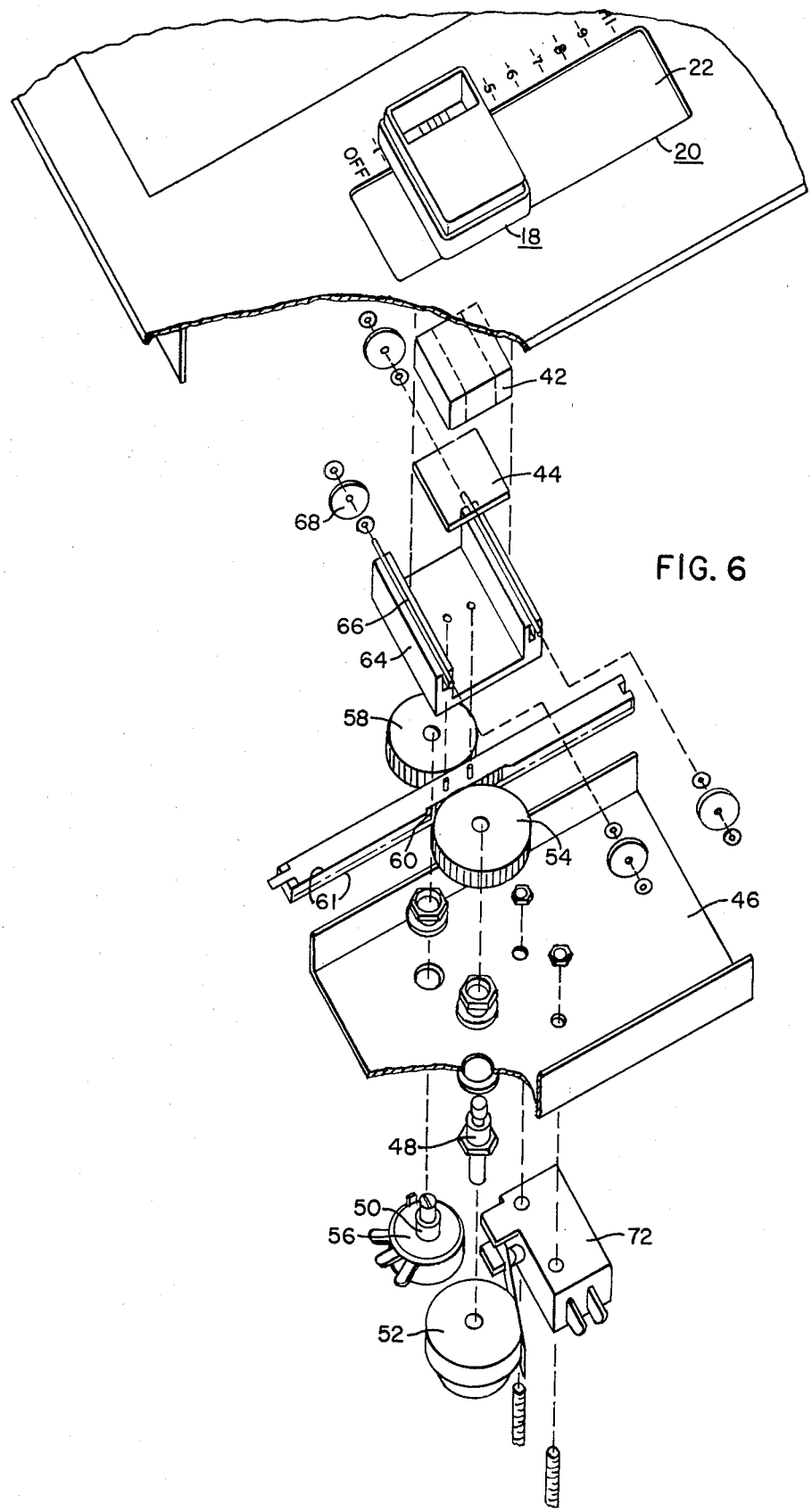
FIG. 6 is an exploded isometric view showing details of the relationship of the parts which serve to transmit movement of the control member through the follower member and associated parts to effect the adjustment of means controlling the surface unit.

As shown in FIG. 1, the induction cook top as viewed from above essentially comprises a generally perimetric frame 10 of relatively thin, substantially non-magnetic material such as aluminum or 300 series stainless steel, with a glass ceramic plate 12 of a character suitably resistant to shock occupying a central opening of the frame and provided with visual indicia 14 for indicating the cooking area and underlying location of each of the induction coils 16. The user-operated control member 18 for each cooking area is located in a control area 20 on the frame adjacent its respective cooking area.

The use of induction heating for domestic cooking purposes is known as evidenced by U.S. Pat. No. 3,275,784, and earlier patents, and accordingly, the principles involved will not be discussed herein. However, it is noted that with the present state of the practical art of using induction heating for domestic cooking, it appears that the cost of such devices will be relatively expensive. Those who would purchase such a device will properly expect deluxe features incorporated therein, as well as an esthetically handsome unit. Hence, the control arrangement of the invention, which is relatively expensive as contrasted to the ordinary rotatable knobs and directly coupled electrical control switches, is consistent in approach in that it does provide deluxe features in easy cleanability of the control areas and is considered to be esthetically very pleasing. This makes it especially well suited for a flush top induction cooking unit, although as noted before, it is not limited thereto.

Each of the control areas 20 on the exposed face of the frame 10 has visual indicia adjacent thereto coordinated with the limits of movement of the control member 18 to correspond with the magnitude at which current is being induced by the induction coil in a given cooking vessel. As shown in FIG. 2, the indicia provides a heat production scale consisting of "off" at one end, "high" at the other end, and the numerals 1 to 9 therebetween. The control area also includes visual indicia to properly locate the control member with respect to its lateral placement, which in the currently preferred form is provided by a slight depression 22 of rectangular outline formed in the frame at each of the control area locations. The radiuses at the edges of the depression are preferably relatively gentle to facilitate cleaning of these corners when the control member is removed.

The control member 18 (FIG. 3–4) includes a multiple pole magnetic block 24 and a high magnetic permeability back up plate 26 encased within a molded plastic shell 28. The shell has projecting runners or skids 30 along its bottom face which are received at the side edges of the depression 22 and serve to space the lower face of the magnetic block 24 from the top face of the depression 22 to prevent scratching of the face. A clear plastic window 32 having a centered index line 34 at its bottom face is held in a side part of the molded shell and overlies the heating rate scale at the side of the depression shown in FIG. 2. The general form of the control member, with respect to the shape of the shell and the manner in which an indexing line is provided is not considered of particular significance with respect to the invention, but is pleasing in appearance and consistent with the appearance of the induction cook top as a whole.

The currently preferred arrangement of poles of the magnetic block 24 in the control member is the best seen in FIG. 4 in which it is shown that the lower or confronting face of the block has three alternating magnetic poles in succession in the direction of movement of the control member, which direction of movement is indicated by the arrows associated with FIG. 4. Each of the end portions 36 and 38 have a dimension in the direction of movement of block which is approximately one half that of the same dimension of the center portion 40 for the purpose of generally balancing the flux distribution. The currently preferred material for the block 24 is Indox V commercially available from the Indiana General Company.

The magnetic block 42 (FIG. 4) of the follower member is of the same material and is also provided with a backup plate 44. Block 42 has three alternating magnetic poles, complementary to the poles of the control member magnet 24, on its face confronting the control area. The preferred arrangement of three confronting poles per block results in a relatively tight shear coupling between the two magnetic blocks. Good registry of the poles of the blocks is highly desirable so that each time the control member is removed from the cooking device and replaced, the alignment of the control member with the follower member will be the same. With the three pole arrangement, it has been observed that when the control member is replaced, with the follower member at any point along the depression, a distinct "feel" when the control member is in the proper relation to the follower member is readily perceived. That is, if the replacement is off by two poles, so that, as seen in FIG. 4, the left hand pole 36 would be overlying the right hand pole of the follower magnet, there is a distinct feel of improper coupling. Thus the control member is then moved longitudinally in one direction or another until it is properly registered with the unseen follower magnet, at which time the strong pull of proper placement is felt.

Another advantage of the three pole arrangement of the magnetic blocks will be explained in connection with FIG. 5. The SNS pole arrangement indicated as 42 at the opposite sides of FIG. 5 corresponds with the orientation of the follower magnets associated with the cooking locations 14 at the left and right sides of the cooking unit. The polarization of the control member 18 associated with each of these locations is also illustrated. As a result of this arrangement, all of the control members may be removed and interchanged with each other when replaced since rotation of a control member 18 180° provides the proper registry of the complementary poles, as well as locating the indexing line 34 of the control member at the side of the control area having the visual indicia for the power rate of the particular cooking location.

FIG. 6 illustrates one mechanism which may be used for linking the follower member, which of course moves directly with the control member, to correspondingly control the induction heating provided by a given cooking location. A channel-shaped bracket 46 is secured to the underside of the frame 10 underlying a particular control area 20. A pair of shafts 48 and 50 are rotatably carried by the bracket with shaft 48 having a cam 50 fixed for rotation on its lower end and a pinion gear 54 fixed on its upper end. The shaft 50 is the shaft of a potentiometer 56 which serves as the adjustable means for varying or modulating the induction of a cooking unit. The upper end of the shaft 50 carries a pinion gear 58. The two pinion gears 54 and 58 cooperate with the rack 60 held between upper and lower strips 61, the longitudinal edges of which chordally overlap the edges of the pinion gears. A pair of pins 62 project upwardly from the center portion of the rack.

The follower member includes the carriage 64 (FIG. 6) in the form of a channel-shaped member in which the follower magnet 42 is seated, and which is provided with axles 66 and wheels 68 adapted to ride against the under face of the frame 10 at the sides of the depression 22 as illustrated in FIG. 3. The carriage 64 is seated on the rack 60 with the pins 62 being received in holes 70 in the base of the carriage. Thus the carriage 64 is fixed to the rack 60 with respect to longitudinal movement of the rack, and longitudinal movement of the rack results in rotation of the pinion gears 54 and 58 and correspondingly rotation of the cam 52 and the potentiometer shaft 50.

By mounting the follower magnet 42 in the wheeled carriage 64, there is relatively little friction in the movement of the follower member in following the control member 18. The wheels 68 of the carriage are held against the lower face of the frame 10 by the attractive force between the two magnets when the control member is in place. When the control member is removed, the upper and lower strips 61 in conjunction with the rack 60 support the carriage 64.

The cam 52 controls the on-off switch 72, which closes upon movement of the control member from the "off" position. The potentiometer 56 controls a signal voltage which in turn varies a dc voltage level applied to the oscillator for the induction heating unit and accordingly controls modulation of power to the induction coil.

With the arrangement shown, when the control member is removed while the power is on, that particular power level will be maintained. This is the currently preferred arrangement, although it is noted that a spring return may be provided to return the carriage to a position corresponding to "off" of the power unit when the control member is removed. The disadvantage of a spring return is that to the extent there might be vibration during a cooking operation, the spring return may tend to change the setting of the control member while cooking is progressing. In this connection, any spring return which would be used would preferably be of the "Negator" type in which a uniform spring force is provided irrespective of the position of the carriage.

FIG. 7 shows an arrangement in which a control member magnet 74 and the follower member magnet 76 have four alternating poles on their blocks, nor give as precise registry. Also, any and is intended to illustrate why three poles are considered preferable to four or more poles. If the control member magnet is replaced with the proper registry of poles being missed by two, a relatively stable feeling could still be obtained since the attraction of the two confronting pole portions would be reasonably substantial, even though not as strong as if the four were in registry. The same situation would of course exist with respect to five confronting poles. For a given amount of magnetic material, two pole magnetic blocks do not provide as strong a coupling force as three pole magnetic blocks nor give as precise registry. Also any even number of poles would require a reversal of pole orientation of the follower magnets at the opposite sides of the platforms, and thus would require right and left hand carriages for each platforms.

FIG. 8 shows the pole arrangement for a control magnet 78 and a follower magnet 80 which may be used if a rotatable control switch is to be directly coupled to the follower. In this case, it is proposed that in addition to the sector poles being arranged in complementary fashion, which would permit mis-registry in a number of positions, an indexing means is provided such as is shown in FIG. 8. For example, a north and a south pole is provided in the center part of each member, on opposite sides of a diameter, with these poles being arranged in complementary fashion with respect to the two members. Such an arrangement aids in obtaining the proper indexing or registry of the control magnet to the follower magnet. Thus, the strongest attraction would be felt when the magnets are placed in proper registry so that all poles of the one are complementary to poles of the other.

In FIG. 9 three alternating poles are obtained on the confronting faces of the control member 82 and follower member 84 by using a single magnetized block of Indox material 86 and 88 for each member, and employing backup plates 90 and 92 which are channel-shaped as shown to provide flux paths which effectively convert the channel edges into poles as indicated. With such an arrangement, the spacing between confronting poles in the operative position of the members should be less than the spacing between the adjacent poles on the face of each member to reduce short circuiting of the lines of force between the block and end poles.

While the provision of a depression 22 in the control area is the currently preferred mode of indicating proper lateral placement of the control member, it will be appreciated that this control area may be flush with the rest of the frame and a simple graphic representation may be provided to aid the user in replacing the control member properly with respect to both its lateral and longitudinal positioning. With the poles of the magnetic portions running for the width of the magnetic blocks, any minor mis-registry laterally when the control member is replaced does not effect significant longitudinal misregistry.

From the foregoing, it will be appreciated that the control arrangement according to the invention has a number of advantages including easy cleanability of the control areas and the control members themselves by their ability to be removed and replaced, the prevention of any leakage into the area where the control function itself is being performed, an improved appearance, and the possibility of removing the knob to prevent operation or tampering with the device by children.

We claim:
1. In a cooking device:
   means for producing heat for cooking purposes;
   adjustable means for varying the heat production of said heat producing means;
   a control panel of substantially non-magnetic material having at least one control area on the exposed face thereof;
   a user-operated control member having multiple alternating magnetic poles on its face confronting the control area, and adapted for movement to exercise control and to be removed completely from said control area;
   a follower member having multiple alternating magnetic poles, complementary to said poles of said control member, on its face confronting said control area adjacent the non-exposed face of said panel;
   means linking said follower member to said adjustable means for adjusting said adjustable means in accordance with movement of said follower member so that as said control member is moved said adjustable means is correspondingly adjusted for controlling production of heat.
2. In a cooking device according to claim 1 wherein: said control member and said follower member each include three alternating magnetic poles on their confronting faces.
3. In a cooking device according to claim 1 wherein: said alternating poles of each of said members are arranged in succession in a direction parallel to the direction of movement of said members.
4. In a cooking device according to claim 1 wherein: said control panel includes a slightly depressed area on the exposed face thereof generally delineating said control area; and
   said control member includes means dimensioned to generally track said control area.
5. In a cooking device according to claim 3 wherein: said control member and said follower member are arranged for substantially straight line movement to effect the adjustment of said adjustable means.
6. In a cooking device according to claim 1 wherein:

said control member includes means supporting said magnetic poles in spaced relation from said control area to prevent direct contact therewith during movement of said control member.

7. In a cooking platform having a number of cooking areas located thereon and encompassed by a frame portion having a control area adjacent each cooking area, and means for producing heat for cooking purposes at each cooking area;

said frame portion being of substantially non-magnetic material;

a control member for each of said control areas, each control member having a number of magnetic poles on its face confronting said control area and including a heat production scale indexing means;

a follower member underlying said frame portion at each of said control areas, each follower member having a corresponding number of magnetic poles on its face confronting the underside of a control area;

a heat production scale at each of said control areas;

means supporting each follower member with its poles in a given orientation;

adjustable means for controlling the rate of heat production of each said heat producing means;

means linking each follower member with its respective adjustable means for adjusting said rate of heat production in accordance with motion of said follower member;

said control members being unattached to said control areas except by magnetic attraction to said follower members;

the poles of each said control member and the poles of each said follower member being arranged so that the poles are complementary to each other to yield the maximum attractive force between said members when the control member is placed on said control area with the relationship between the control member scale indexing means and said heat production scale corresponds to the particular setting said adjustable means then occupies, so that correct indexing is readily obtained upon the replacement of said control members after their removal.

8. In a control arrangement for a device: a control panel having a substantially non-magnetic control area;

a user-operated control knob having multiple alternating magnetic poles on its face adapted to confront the exposed face of said control area;

a movable follower adjacent the non-exposed face of said control area, having multiple alternating magnetic poles on its face confronting the non-exposed face of said control area, said follower poles being arranged in complementary relation with respect to the poles of said control knob;

means connecting said follower to means for controlling the operation of said device in accordance with movement of said follower;

said control knob being held in place only by the magnetically attracting forces between the poles of said control knob and said follower so that said control knob is readily removable therefrom, with the proper indexing of the control knob to the follower upon replacement being readily detectible by a firm feeling of magnetic attraction.

* * * * *